United States Patent [19]

Failing, Jr. et al.

[11] Patent Number: 5,448,226
[45] Date of Patent: Sep. 5, 1995

[54] SHELF TALKER MANAGEMENT SYSTEM

[75] Inventors: Bruce F. Failing, Jr., Greenwich; Robert J. Venable, Darien; Jeffrey T. Sandgren, New Canaan; Anthony P. Fernandez, Ridgefield, all of Conn.

[73] Assignee: Electronic Retailing Systems International, Inc., Wilton, Conn.

[21] Appl. No.: 201,470

[22] Filed: Feb. 24, 1994

[51] Int. Cl.⁶ .................... G06F 7/12; G06F 15/00; G06K 7/00
[52] U.S. Cl. .................. 340/825.35; 364/403; 235/383; 340/825.55
[58] Field of Search ............ 340/825.35, 825.55, 340/568; 235/383; 364/401, 402, 403, 404, 464.01, 464, 465, 226.3, 918.4, 918.51

[56] References Cited

U.S. PATENT DOCUMENTS

| | | | |
|---|---|---|---|
| 4,002,886 | 1/1977 | Sundelin | 340/825.35 |
| 4,346,453 | 8/1982 | Drapeau et al. | 340/825.35 |
| 4,500,880 | 2/1985 | Gomersall et al. | 340/825.35 |
| 4,783,740 | 11/1988 | Ishizawa et al. | 364/403 |
| 4,821,291 | 4/1989 | Stevens et al. | 340/825.35 |
| 4,888,709 | 12/1989 | Revesz et al. | 340/825.35 |
| 4,962,466 | 11/1990 | Revesz et al. | 340/825.35 |
| 5,019,811 | 5/1991 | Olsson et al. | 340/825.35 |
| 5,111,196 | 5/1992 | Hunt | 340/825.35 |
| 5,172,314 | 12/1992 | Poland et al. | 340/825.35 |
| 5,198,644 | 3/1993 | Pfieffer et al. | 340/825.35 |
| 5,241,467 | 8/1993 | Failing et al. | 340/825.35 |
| 5,245,534 | 9/1993 | Waterhouse et al. | 340/825.35 |

FOREIGN PATENT DOCUMENTS

| | | |
|---|---|---|
| 299355 | 1/1989 | European Pat. Off. |
| 9305456 | 3/1993 | WIPO |
| 9305475 | 3/1993 | WIPO |

*Primary Examiner*—Donald J. Yusko
*Assistant Examiner*—Mark H. Rinehart
*Attorney, Agent, or Firm*—Oppedahl & Larson

[57] ABSTRACT

A system has a central store computer and a multiplicity of electronic shelf labels (ESLs). Each label has a means to detect the presence of an ESL-mounted shelf talker. The system automatically audits the store for the proper set of installed shelf talkers. The detection means is an optical port, a pressure sensor such as a button, or a capacitive sensor. The sensor will detect the presence of the shelf talker as well as the absence of the shelf talker. The talker may snap into a recessed optical port, the recessed port serving as a mounting mechanism as well, thus ensuring a more reliable indication that the shelf talker is installed. The sensor may be a capacitive sensor, detecting the presence of a metallized region on the shelf talker. An audit is performed by the connected host computer, which maintains a database of all products with ESLs, and specifically includes data as to which ESLs (products) are on which promotional event, the starting and end dates, and the actual (current) status of whether a shelf talker is installed.

26 Claims, 7 Drawing Sheets

SHELF TALKER MANAGEMENT SYSTEM

SPECIFICATION

The invention relates generally to the real-time or near-real-time control of the placement and removal of bibs or shelf talkers in retail stores having electronic price display systems.

Anyone who visits a grocery store or convenience store will be familiar with the myriad ever-changing eye-catching contrivances disposed throughout the store as part of the marketing efforts of store management. These include window banners, aisle end caps, and so-called "shelf talkers" or "bibs" placed at shelf locations where items are on sale or are otherwise urged to be of particular interest to the customer. For the purposes of this discussion the terms "shelf talker" and "bib" will be treated as synonymous, representing signs or cards or other printed material placed at the shelf locations of particular items. Some shelf talkers are made of stiff plastic with ears to grip a standard "c" channel at a shelf edge. Other shelf talkers have an adhesive strip that attaches to a shelf edge. Still other shelf talkers are cards that are taped to shelf edges.

While shelf talkers have proven themselves to have important marketing value, they have historically presented several drawbacks. First, a product may appear in two or more store locations and yet store personnel may happen only to hang a shelf talker at one of the locations. Second, store personnel, especially if pressed for time, may be unable to locate a product for which a shelf talker is to be placed, and may simply fail to place the shelf talker. Third, the process of placing the shelf talkers is time-consuming, typically starting with shelf talkers that are not in any sequence that would save time based on store locations other than, perhaps, a crude grouping by department (e.g. cereal, baking needs, produce, etc.). Fourth, while an employee may manage to install all the new shelf talkers that need to be installed, it is easy to fail to take down one that must be taken down. If a product appears in two store locations and if each location had a shelf talker, then when the time comes to take down the shelf talkers (e.g. when the sale is over) the employee may remove one and may not appreciate that there is a second shelf talker to take down.

For the maximum economic benefit to the store, the promotional shelf talkers must be installed early on the day the sale commences, preferably before business hours. For 24-hour stores there is no "before business hours" so that the change is desirable immediately after the price change batch has been released to the point-of-sale (POS) system. To avoid unfavorable consumer reaction, inaccurate pricing, unfavorable government agency audits or unfavorable media publicity, the shelf talkers should be removed at the end of the last day of the sale, or immediately prior to the release of the price restoration batch to the POS system.

These activities must be scheduled by the store management, along with all the other shelf stocking activities in the retail environment, and an audit is required to ensure that the job is completed and that no products are missed. This can be a difficult task, because not all shelf talkers come down or go up at the same time. For example it is commonplace in a store to have some sale items that expire on a particular day each week, and to have other sale items that continue to be on sale for a longer time or to coordinate with a media effort to publicize the sale. This leaves the possibility that even the most conscientious employee may overlook a shelf talker that should be put up or taken down. Considering that this activity is often performed by shelf stockers at the end of their shift, in the early hours of the morning, under pressure to complete the task before the early shoppers arrive, it is highly likely that some errors or omissions will occur. Even a thorough manual audit may miss some of the shelf talkers due to the quantities of changes involved and the similarity of some products.

Numerous and diverse systems for the electronic display of store prices have been attempted over many years, most of which have proven unworkable or uneconomic. But in recent years technologies have been developed that permit the efficient, economical electronic display of prices via electronic shelf labels (ESLs) that are mounted to rails on shelf edges. It is desirable that a system for managing shelf talkers be integrated efficiently with an associated electronic price display system. Some ESL systems have a clear plastic cover on the rail, protecting the labels.

Among the desirable features of a shelf talker management system, then, are the following.

It is desired to have a flexible "bib" which can be attached to or paired with an ESL to display item-specific promotional or merchandising information for that product. The bib should be as physically flexible as existing paper-based bib solutions so it minimizes interference with the product stocking and removal process. The bib should require minimal labor to attach to the ESL. The bib should not require additional components which would increase the cost of implementing the solution. The solution should work for ESLs with or without a rail cover. The bib should firmly attach to the ESL, but should be able to be removed quickly and easily.

The process for placing and removing the bibs or shelf talkers would allow the chain to implement item-specific bibs which have price information printed on them that is intended to correlate to the price to be shown on the ESL. The process should only require one "pass" through the aisle to remove old bibs and to attach new bibs. The process should eliminate (or at least minimize) the risk that the ESL and the bib price or data will fail to match. The process should provide positive confirmation that the bib for each item was hung, since failing to hang a bib can significantly reduce sales and margins. The process should provide security such that only authorized employees can implement price changes. Consumers must be prevented from being able to implement a price change. The process should help the employee identify those ESL products requiring a bib and those items which should have their bib removed.

SUMMARY OF THE INVENTION

The invention combines a means to detect the presence of an ESL-mounted shelf talker with method to automatically audit the store for the proper set of installed shelf talkers. The detection means includes a presence detection technique, such as an optical port, pressure means (button), capacitive sensor, or other proximity sensor. The sensor will detect the presence of the shelf talker as well as the absence of the shelf talker. If an optical port is used, the shelf talker may be a simple adhesive-backed opaque printed label that is affixed over the port. Alternatively, it may be a plastic (or other suitable material) device, acting as a holder or backer for printed signs, or perhaps embossed with information such as "SALE", that fastens over or onto the ESL, effectively covering the optical port when installed. The device may snap into a recessed optical port, the recessed port serving as a mounting means as well, thus ensuring a more reliable indication that the shelf talker is installed. Other means of sensing may be a capacitive sensor, detecting the presence of a metallized Mylar shelf talker or other metallic material on a holder, a magnetic sensor, or a pressure sensitive sensor actuated by the attachment of a holder.

An audit will be performed by the connected host computer, which maintains a data base of all products with ESLs, and specifically includes data as to which ESLs (products) are on which promotional event, the starting and end dates, and the actual (current) status of whether a shelf talker is installed. When a new promotion is to be released to the POS system, the system can generate a first report, geographically ordered from the location information measured and stored by the system, instructing the employee of the ESLs requiring a shelf talker to be affixed, and providing the most efficient (economical) order in which to accomplish the task. The system monitors the installation of the shelf talkers by querying the ESLs in the expected installation sequence in a special mini-bed-check audit, or simply collects the data during the next several regular bed-check loops. A second report will be generated, either automatically or upon completion of the installation process. This second report will check all ESLs which required the shelf talker to be installed for presence of the shelf talker, and the report will list the exceptions, i.e., the ESLs which are missing shelf talkers. A third report may be generated as a complete audit of the store, checking all ESLs (not just those associated in a recent batch) to determine whether any shelf talkers are missing, or whether any shelf talkers are installed where they do not belong. Similarly, additional audit reports may be generated to audit the removal of shelf talkers when a product comes off promotion. Audit reports may be automatic or manual. Remote audits, such as from corporate headquarters, may be conducted through the communications means already in place to provide price change information. Automatic audits may generate reports, sound alarms, or even cause prepared electronic or voice messages to be sent to the appropriate manager via automatic telephone dialling and modem means.

The benefits of this invention include promotion integrity (i.e., not allowing promotional for product no longer on sale), accurate merchandising (promotions) for product on sale to maximize revenue from the promotion, and labor savings from a more efficient shelf installation/removal process.

DESCRIPTION OF THE DRAWING

The invention will be described with respect to a drawing, of which.

Where possible for clarity like elements have been shown with like reference numerals.

DETAILED DESCRIPTION

Figures 1, 2, 3:
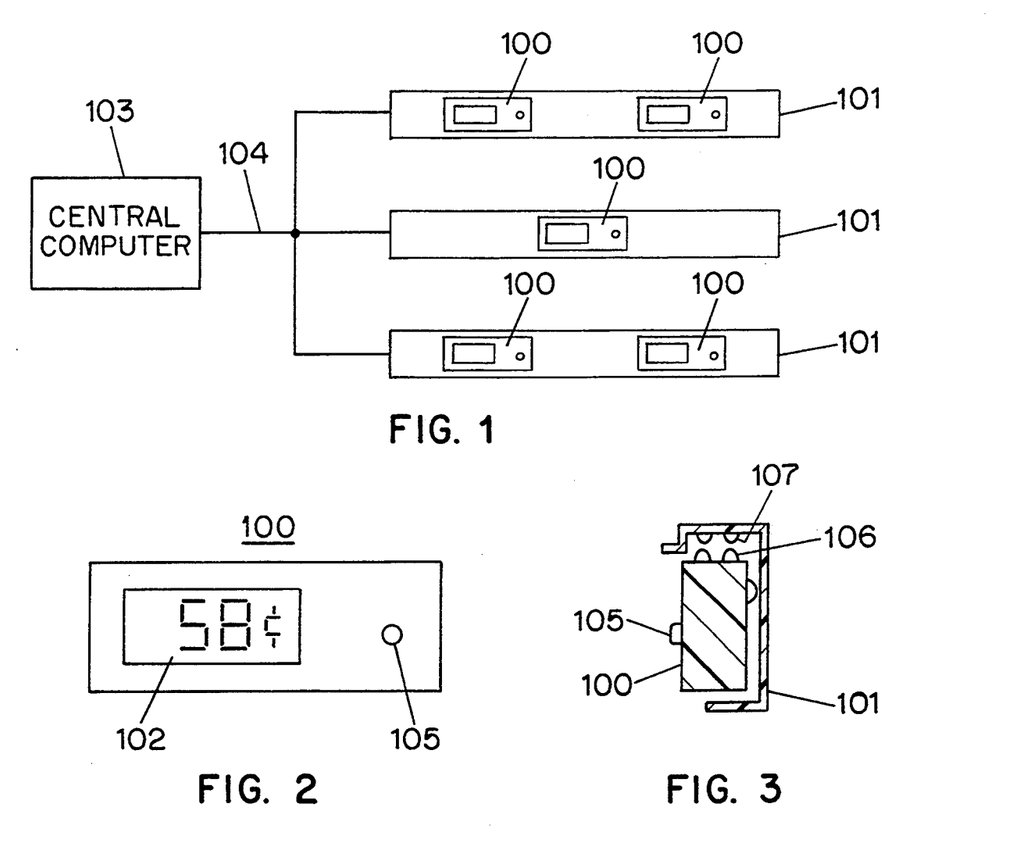
FIG. 1 shows in schematic form a store electronic price display system with a central computer and many electronic price display labels.
FIG. 2 shows in front view an electronic price display label.
FIG. 3 shows in cross section a rail and a price display label.

FIG. 1 shows in schematic form a store electronic price display system with a central computer 103 and many electronic price display labels 100. The labels are mounted to rails 101, and the rails are in turn mounted to the edges of shelves in the store. The shelves and the store are omitted for clarity in FIG. 1. The computer and the labels are communicatively coupled by a communications channel 104, which is shown in FIG. 1 as a wireline bus. Indeed one preferred embodiment employs a serial asynchronous data bus with three wires supplying power, data, and ground to all labels. In another embodiment the communications channel is wireless, using a radio frequency (RF) channel or an infrared channel. In the case of a wireless display system the labels are each powered by a battery, by a photocell, or both. If a photocell is used it is preferably integral with the display which is a liquid-crystal display (LCD), and is located behind the visible part of the display. The rails are disposed so that a label may be snapped into place at any of a multiplicity of locations along the rail, and may be moved from time to time. Any of several mechanisms may be employed to let the computer know the physical locations of the labels and a database is maintained at the computer, having one record per label, including among other things the location of the label and the product for which information is to be displayed. In this connection the label location means at least the identity of the particular shelf at which a label is located, and may optionally include detailed information indicating the location of the label on the rail.

FIG. 2 shows in front view an electronic price display label 100. The display 102, preferably the above-mentioned LCD, is controlled by a microprocessor in the label 100. (Those skilled in the art will appreciate that generically the microprocessor in the label is simply a means for controlling the label, and that those skilled in the art could readily employ other electronics, such as random logic or a state machine or application-specific integrated circuit (ASIC), in place of the microprocessor, without departing in any way from the invention.) A button 105 on the label may be pressed by the customer, e.g. to cause the microprocessor to show a unit price or other alternative information, or may be pressed by store personnel to give a signal to the store central computer 103 for other reasons.

FIG. 3 shows in cross section a rail 101 and a price display label 100. In this embodiment there are electrical contacts 106 on the label 100 which engage conductors 107 along the rail 101, and the conductors form part of a wired communications channel 104 (see FIG. 1). Mechanical features omitted for clarity in FIG. 3 permit labels 100 to be readily snapped into place on the rail 101, and make it relatively difficult for persons other than store personnel to remove a label 100 from a rail 101.

Figure 4:
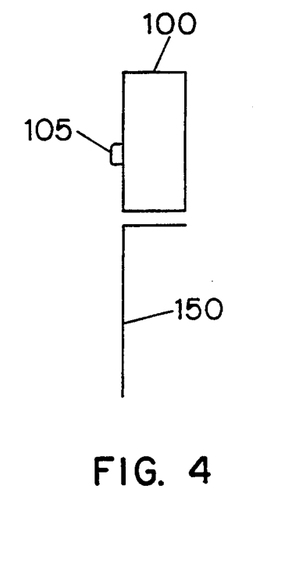
FIG. 4 shows in side view one embodiment of a shelf talker affixed to an electronic price display label.

FIG. 4 shows in side view one embodiment of a shelf talker or bib 150 affixed to an electronic price display label 100. The bib attaches with an adhesive to the bottom of the label 100. This offers numerous advantages over prior art bib mounting methods, for example, if any adhesive remains after the bib is removed it accumulates in a location (the bottom of the label) that is not in plain view. The button 105 may be seen. In one method according to the invention the central computer, not shown in FIG. 4 for clarity, may be programmed so that if a bib is to be attached to the particular label 100, it will watch for pressing of the button 105. When the store employee affixes the bib 150, the employee can press the button 105 which is noted at the central computer. Indicia on the front of the bib 150 are visible to the store employee (and are later visible to customers) and the central computer can cause the display on the label 100 of the new price. The employee can visually cross-check the displayed price and the price indicated on the bib, and can press the button to indicate that the cross-check is successful.

Figure 5:
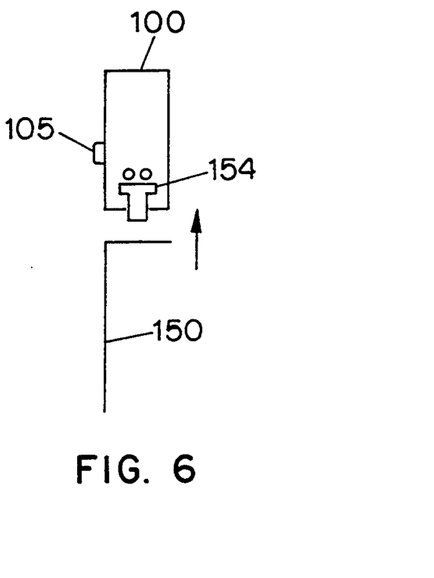
FIG. 5 shows in side view an embodiment of a shelf talker affixed to a price display label having a phototransistor.

FIG. 5 shows in side view an embodiment of a shelf talker 150 affixed to a price display label 100 having a phototransistor 153. The phototransistor is against an opening on the bottom face of the label. When there is no bib in place some level of ambient light is sensed at the phototransistor. When the bib is in place, much less light is received at the phototransistor. This is because the bib is opaque, either because it is made of a material chosen for its opacity (e.g. thick paper, cardboard, or plastic) or because the material has been pigmented (e.g. by ink or paint or dye). The opacity of the bib is important at the part of the bib that will be juxtaposed to the opening and the phototransistor, although for simplicity of fabrication the entire adhesive area (and indeed the entire bib) may be opaque.

It is thought that a fixed threshold light level will permit the label to distinguish between the bib-present and bib-absent conditions. However, in some stores it might prove necessary to take a time derivative of the received light level to detect placement and removal of bibs. Another approach is to use a zero-level shifter which averages the ambient light level over some time, the output of which is a threshold against which the present ambient light level is compared. Those skilled in the art will appreciate that such changes in the particular light-detection circuitry depart in no way from the spirit of the invention.

Those skilled in the art will appreciate that while it is preferred to have the opening and phototransistor at the bottom of the label 100, it would in no way depart from the invention if the hole and phototransistor were elsewhere on the label, for example on the front.

Figure 6:
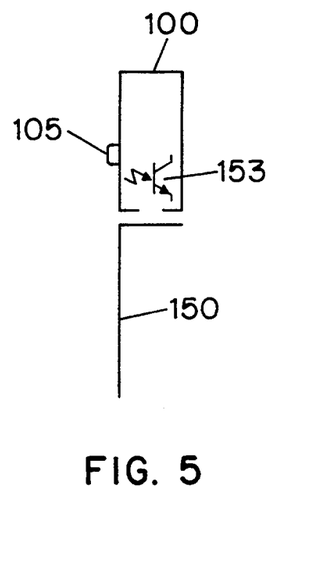
FIG. 6 shows in side view an embodiment of a shelf talker affixed to a price display label having a push-button sensor.

FIG. 6 shows in side view an embodiment of a shelf talker affixed to a price display label having a push-button mechanical sensor 154. In this embodiment the placement of the shelf talker presses the mechanical sensor 154 on the bottom of the label 100, and removal of the shelf talker releases the mechanical sensor. The fold in the shelf talker, formed at the scored or die-cut line 146 (see FIG. 14), helps to keep the label rigid so that the button of the sensor 154 continues to be pressed.

Figure 7:
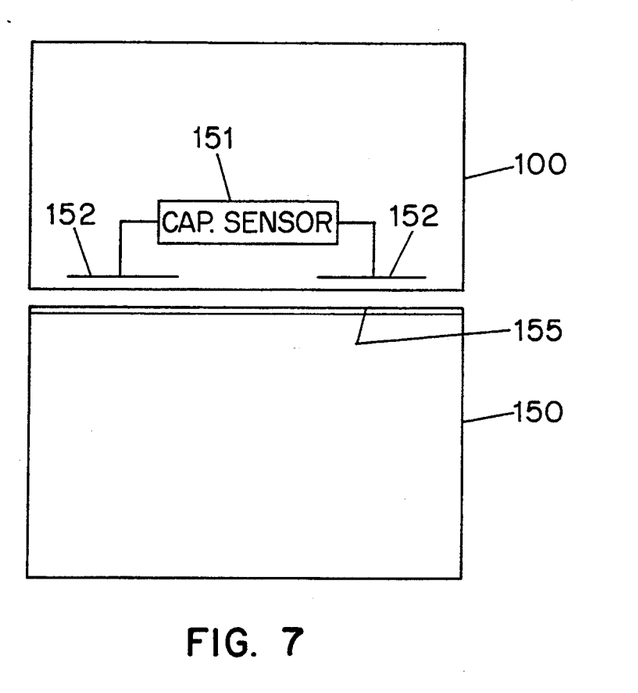
FIG. 7 shows in front view an embodiment of a shelf talker affixed to a price display label having a capacitance sensor.

FIG. 7 shows in front view an embodiment of a shelf talker 150 affixed to a price display label 100 having a capacitance sensor 151 with sensing plates 152. A metallized region 155 of shelf talker 150, if present, changes the capacitance detected between the plates 152.

As was mentioned above with respect to the optical sensor, while the sensor locations of FIGS. 6 and 7 are thought to be optimal, they could be placed elsewhere such as on the front of the label without departing in any way from the invention.

Figure 18:
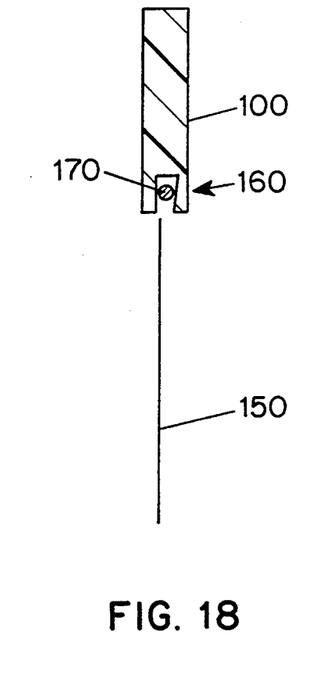
FIG. 18 shows in cross section a label and a gripper for holding a shelf talker in accordance with the invention.

Turning ahead to FIG. 18, there is shown a gripper 160 set into a groove on the bottom of the label 100. The gripper 160, preferably a cylinder that is captive in the V-shaped groove, provides an easy place to mount shelf talkers 150. The shelf talker is removed by quickly lifting it which moves the cylinder up. While the cylinder is still up the shelf talker is quickly withdrawn. If this gripper is provided then the sensor of FIGS. 5, 6, or 7 is preferably located within the groove.

Figure 8:
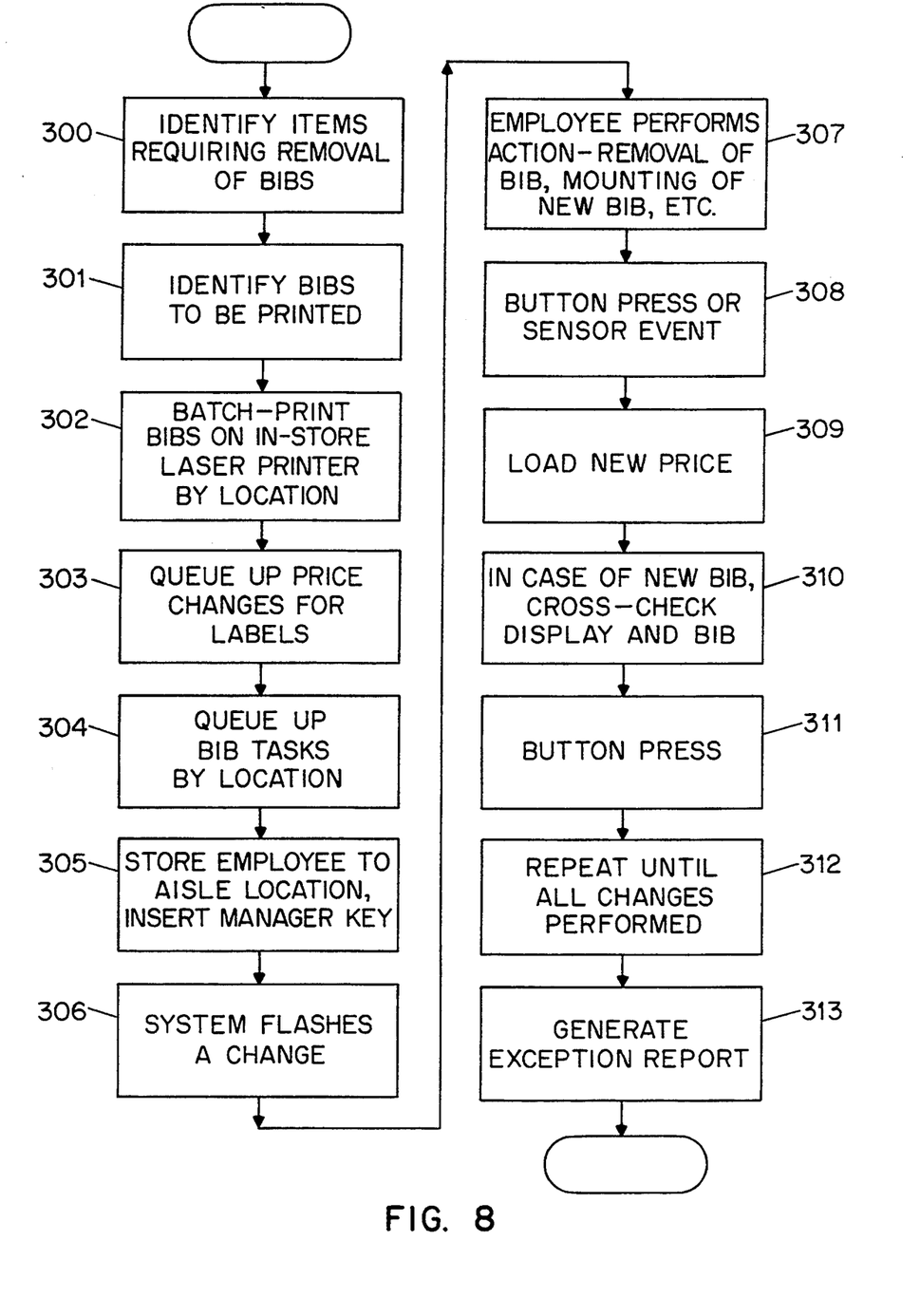
FIG. 8 shows in flowchart form the process to be followed in managing the placement and removal of shelf talkers (bibs) according to the invention.

FIG. 8 shows in flowchart form the process to be followed in managing the placement and removal of shelf talkers (bibs) according to the invention.

At 300 the system identifies items requiring removal of bibs, and at 301 the system identifies bibs that need to be printed, preferably on an in-store printer such as that set forth in U.S. Pat. No. 5,172,314. The bibs are preferably batch-printed on the printer, in print sequence according to the physical sequence in which the associated labels are found in the store, as shown in box 302.

The price changes that will be sent to the labels are queued up for transmission to the labels, as shown in box 303.

A list is generated at 304, ordered by the sequence of physical locations of labels, of desired placements and removals of shelf talkers.

The aforementioned steps can be performed in the order described, or in varying order and some of the steps, if necessary, could run in parallel to save time.

Once the set-up activities have been finished it is time for the employee aisle activity to begin. A store employee who is designated for shelf talker update duties, and who is familiar with the paper lists, shelf talkers, store layout, and label displays, enters the merchandise area of the store as shown in box 305, and inserts a manager's key into a shelf rail. This is detected by the system and prompts the system to change the labels in the vicinity from their normal display contents to special displays indicating shelf talkers to put up or take down.

Such a display change is shown in box 306. At 306 the central computer causes a label to annunciate, at its display, an indicium indicating that it is a label with respect to which a placement or removal of a shelf talker is desired. The indicium may be a flashing light, a blinking liquid-crystal display, or anything else that will catch the eye.

The manner in which the system detects the manager's key is set forth in copending U.S. appl. Ser. No. 757,675, filed Sep. 10, 1991. Interactions between the store central computer and the labels, including the detection of button presses, may be accomplished as set forth in copending U.S. appl. Ser. No.07/995,048.

At box 307 the employee performs a directed action. Depending on the displayed indicium, the employee may remove an old bib, post a new bib, or take other action such as confirming that an old bib that should stay in place is still in place.

At 308 information is received from the labels on the list regarding changes in the signals from the sensors thereof. In this context the signals represent either button presses from a store employee indicating that each task has been completed, or sensor data in which label sensors sense that a task has been completed.

At 309 the display of a label is restored after information is received indicating that the desired placement or removal of a shelf talker has occurred. In the usual case this means the label goes back to showing the price, or in the case of a price change this means showing the new price.

If the bib relates to a price change then the new price is showing on the label, and it would be desirable that the employee cross-check to see that the label and bib are in agreement as to the new price. This cross-check is shown in box 310. Assuming the two prices match, the employee will have been trained to press the button on the label, as shown in box 311.

The above-described steps are repeated for each change that needs to be performed. Desirably the changes are displayed, physically accomplished, and sequenced according to the physical store layout, based on information stored in the system indicating the physical locations of labels.

Those skilled in the art will appreciate certain particular benefits offered by the invention. For example, suppose a product is physically located at two different places in the store and needs to have a shelf talker taken down. The prior-art systems employed would force an employee who has reached one location of the product and removed the talker to do one of two things—(1) walk immediately to the other product location to take down the talker, then return to the previous area; or (2) try to remember to take care of the second product location later. The first is wasteful of the employee's time, while the second runs the risk that the second shelf talker will be forgotten.

It will be recalled that in the system according to the invention, each label action taken is annunciated to the system, either by sensors in the affected labels, or by button presses or other messages sent by the employee. At 313 the store central computer notes labels, if any, that are on the list and for which no signal was received indicative of the desired placement or removal of a shelf talker.

The system according to the invention may also interrogate labels one by one to see if they have shelf talkers attached; the results of this check, called a bed check, can be cross-checked with the database records as to which labels are supposed to have shelf talkers attached. The resulting exception report obviously makes it easy to correct any errors, which might include old talkers that should have been removed, or new ones that should have been put into place.

The detailed sequence can vary somewhat from the above in another embodiment of the invention. In this alternative embodiment, the electronic price display (ESL) system processes a batch of data from the store point-of-sale (POS) system and identifies items which require bibs to be printed and items requiring bibs be removed. The ESL system software groups batches so that a store employee can print bibs on an integrated laser printer in sequence by aisle. The ESL system software queues price changes for items going on promotion. A store employee proceeds to the aisle to implement price changes concurrently with bib hanging. The store employee identifies labels requiring a bib by noticing the flashing annunciator. The store employee inserts the manager's key into the rail. The system spots the key and begins looking for button-push sequences which match the pattern identified for in-aisle price change activation. (In the simple case the pattern is simply that the label button is pressed once.) The employee pushes the button on the ESL for which the bib will be hung. The employee proceeds with hanging the bib while the software downloads the new price to the ESL. The employee visually verifies that the ESL price and the bib data/price match and then removes the manager's key from the system or continues on to the next ESL requiring a bib. Pending completion of bib hanging the system can output a report identifying any items which were supposed to have a bib hung but were not updated in-aisle.

Figure 9:
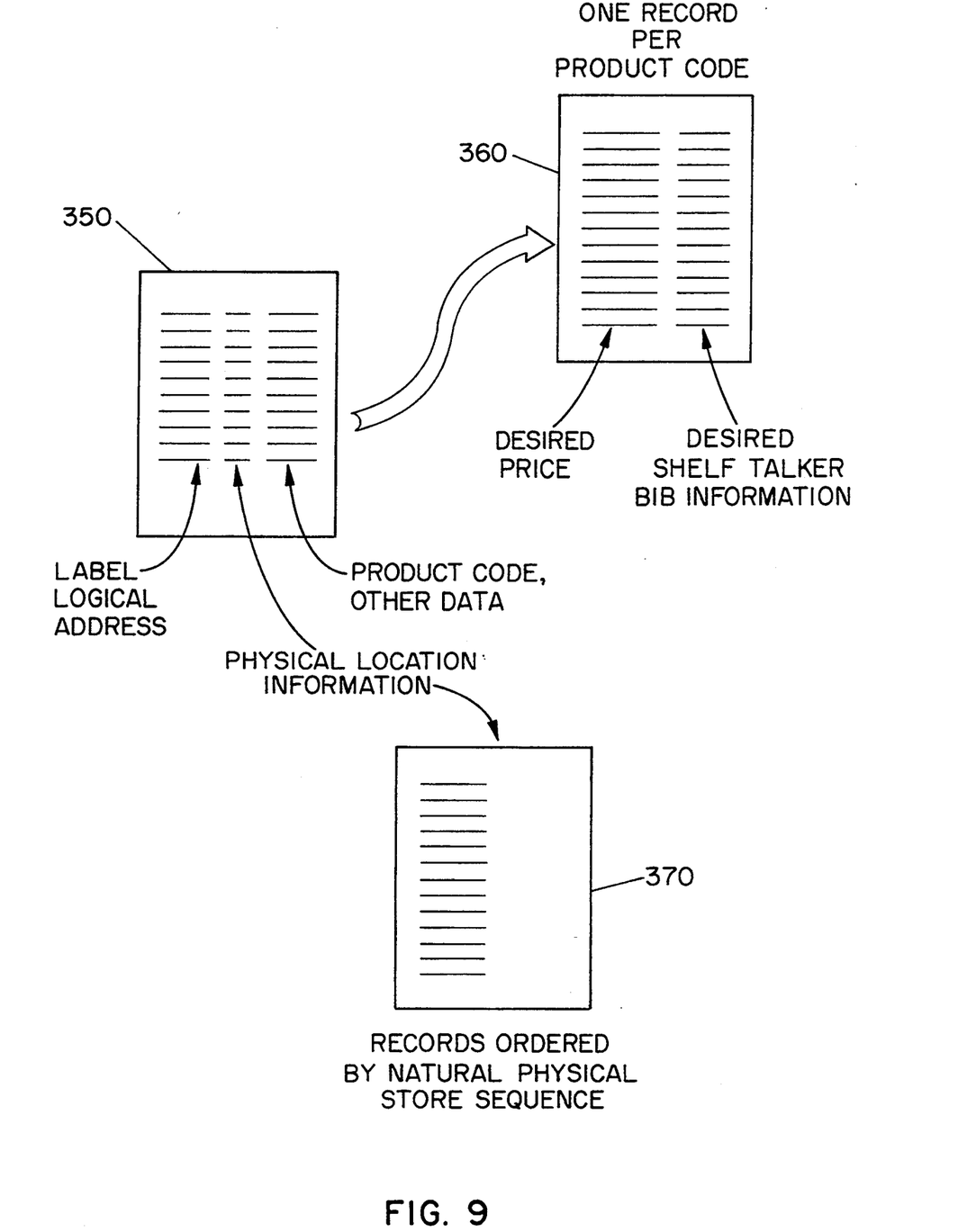
FIG. 9 depicts a database structure containing information on physical locations of labels and on desired bib placements and removals.

FIG. 9 depicts a database structure containing information on physical locations of labels and on desired bib placements and removals. The database structure includes a database 350 which has one record for each price display label. Each label record includes the unique logical address of the label, information on the physical location of the label, and information regarding the product code for which information is to be displayed. The database structure also includes a database 360 which has one record for each product code, containing the price to be displayed and other information such as whether or not a shelf talker (bib) is to be present at the product. Finally, there is a database 370 which has records, ordered according to a natural physical store sequence, containing physical location information.

In a price display system it is typical to have a way of finding out, for each label, the identity of the particular four-foot shelf section at which the label is located. The shelves have so-called "appenders" that provide information to the store central computer as to the location of particular labels. The appenders may be those described in U.S. Pat. No. 5,245,534. The physical store locations of labels may be maintained in data structures such as are described in U.S. Pat. No. 5,241,467.

While the invention is described with respect to a particular database arrangement, those skilled in the art will appreciate that many other database arrangements could be devised that would accomplish the same result and which would in no way depart from the invention.

Figure 10:
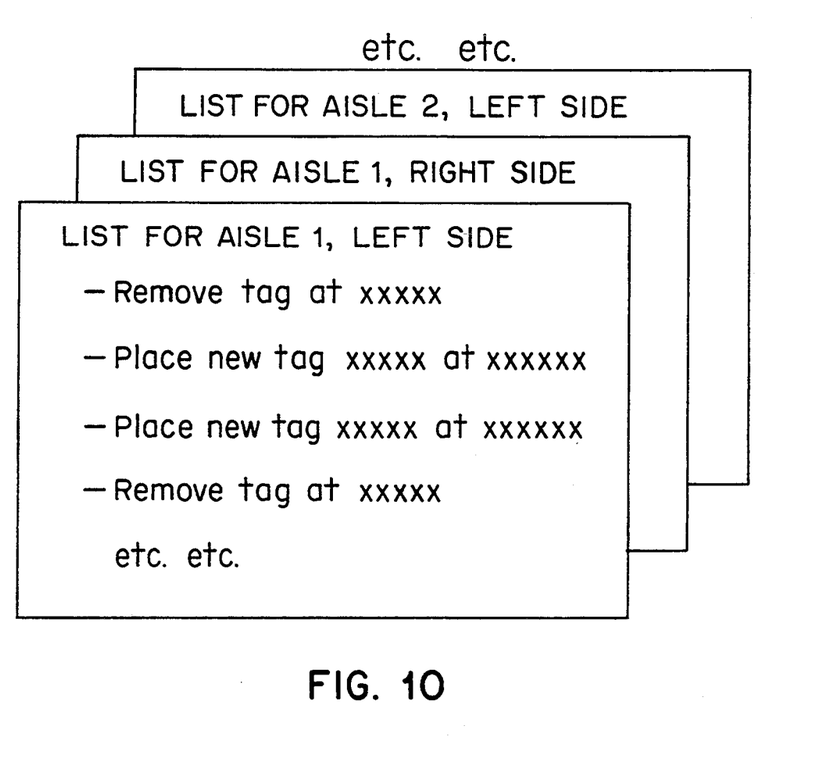
FIG. 10 shows bib (tag) placement and removal lists generated according to the invention.

FIG. 10 shows bib (tag) placement and removal lists generated according to the invention. In this example, the lists show actions to be taken on one side of an aisle, actions to be taken on the other side of the same aisle, actions to be taken on one side of the next aisle, and so on. This is thought to be optimal in many store layouts. Those skilled in the art will appreciate that with some store layouts the time-optimal presentation of the placement and removal lists could be different. For example in some stores it might save time to show all changes on both sides of an aisle, in sequence as one walks along the aisle.

Figure 11:
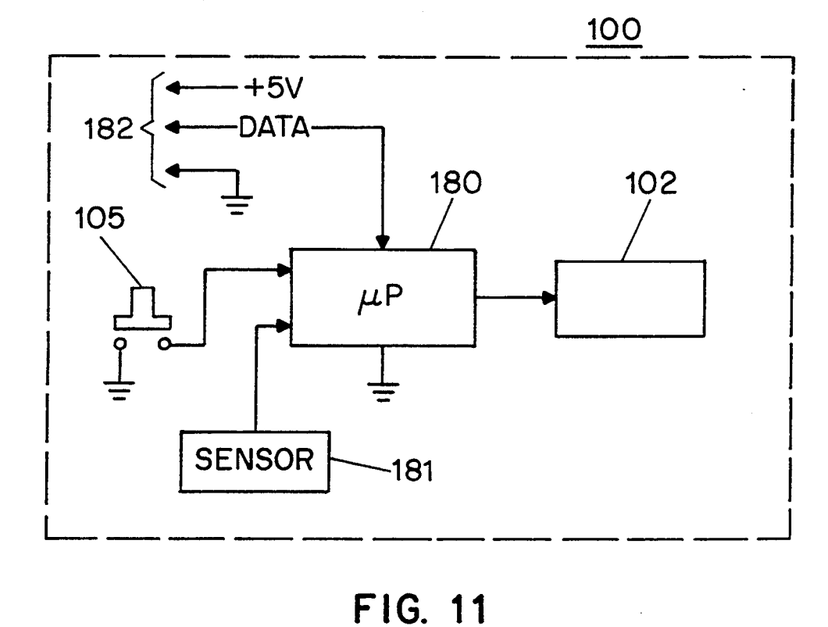
FIG. 11 shows in schematic form an electronic price display system having a bib sensor, and connecting to a wireline bus.

FIG. 11 shows in schematic form an electronic price display 100 system having a bib sensor 181, and connecting to a wireline bus at 182. The sensor may be any of several types of sensor, detailed below. The sensor 181 is one of several inputs to a processor 180, along with a pushbutton 105. In this arrangement power is supplied by the bus. Liquid-crystal display 102 is driven by the processor; optionally a light-emitting diode (omitted for clarity in FIG. 11) may be driven by the processor 180. Where power is supplied by the bus, it is desirable to protect against a short circuit that would otherwise disable all parts of the electronic price display system, and protective circuitry is preferably employed such as that described in copending U.S. appl. Ser. No. 07/757,259.

Figure 12:
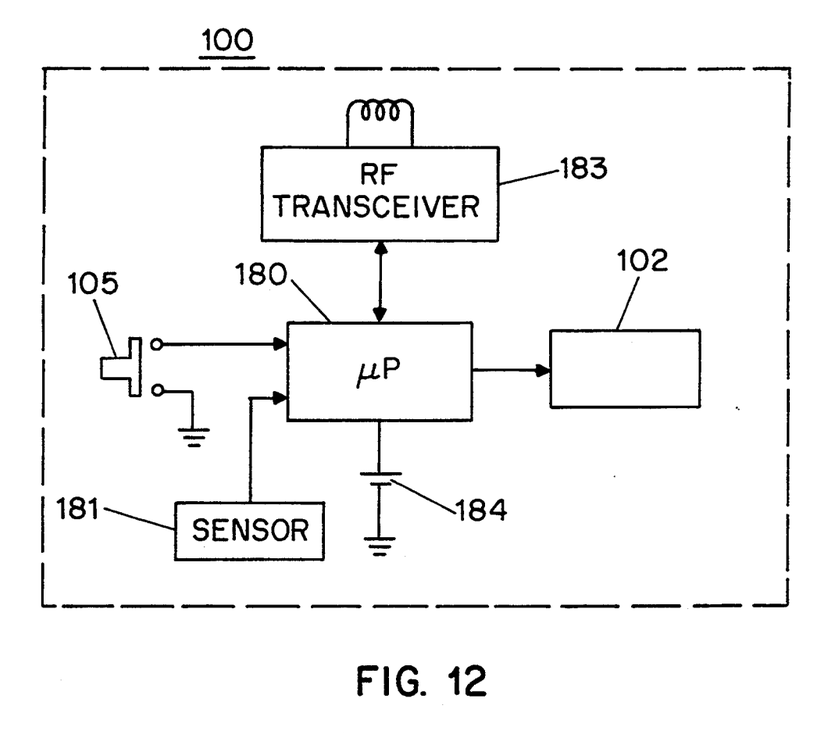
FIG. 12 shows in schematic form an electronic price display system having a bib sensor, drawing power from a battery or other electrochemical cell, and connecting to an RF transceiver.

FIG. 12 shows in schematic form an electronic price display 100 system having a bib sensor 181, drawing power from a battery 184 or other electrochemical cell, and connecting to an RF transceiver 183.

Figure 13:
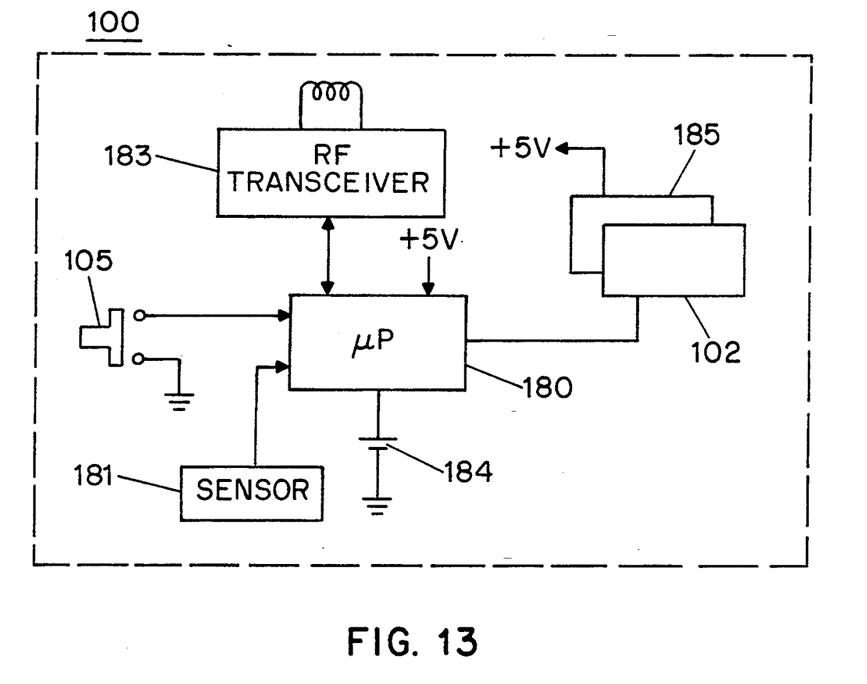
FIG. 13 shows in schematic form an electronic price display system having a bib sensor, drawing power from a solar cell, and connecting to an RF transceiver.

FIG. 13 shows in schematic form an electronic price display 100 system having a bib sensor 181, drawing power from a solar cell 185, and connecting to an RF transceiver 183. The solar cell 185 is located behind the LCD 102, and receives ambient light through the LCD 102.

Figure 14:
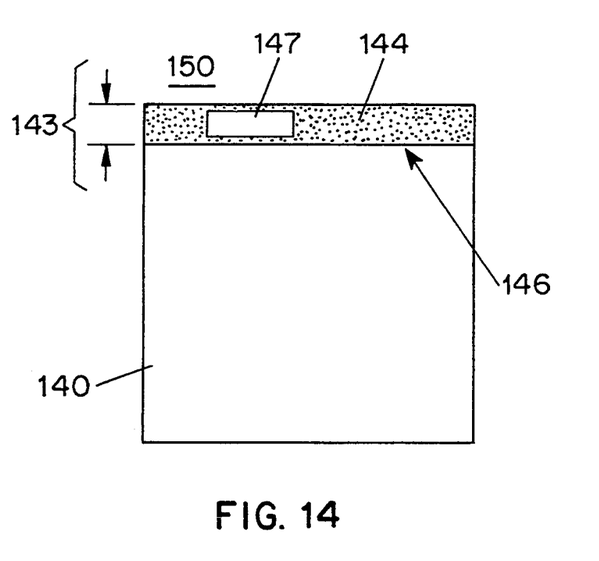
FIG. 14 shows in plan view a shelf talker with a region disposed to trigger a sensor in a price display label.

FIG. 14 shows in plan view a shelf talker 140 with a region 147 disposed to trigger a sensor 181 in a price display label 100. The talker has an adhesive area 144 which is covered initially with a removable strip 142 that is die cut at 146. The dimension 143 is selected to let the strip attach neatly to the bottom of the electronic shelf label (ESL) 100.

Fabrication can be as follows. A single piece of adhesive-backed paper or vinyl has a perforation cut approximately three-eighths of an inch from the top so the backing can be removed and the ⅜ inch adhesive area applied to the bottom of the ESL. This allows the balance of the bib to hang below the ESL.

Figure 15:
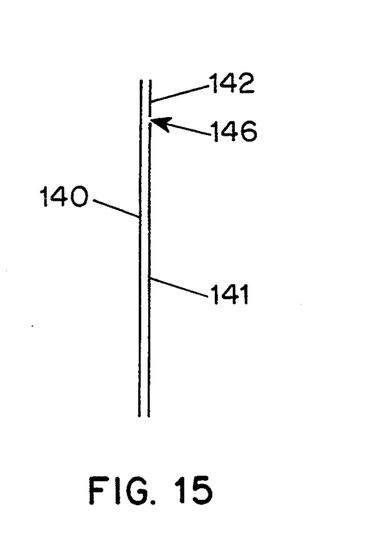
FIG. 15 shows in edge view a shelf talker with an adhesive-backed main body and with the nonstick backing removable in a strip at the top of the main body.

FIG. 15 shows in edge view the shelf talker of FIG. 14 with an adhesive-backed main body 140 and with the nonstick backing 142 removable in a strip at the top of the main body.

The shelf talker shown in FIGS. 14 and 15 is one with adhesive on the rear side. This has the advantage that it may be fabricated from readily available, inexpensive adhesive-backed paper or vinyl. Those skilled in the art will appreciate that for some electronic shelf label designs described herein, a different adhesive configuration is optimal.

Figure 16:
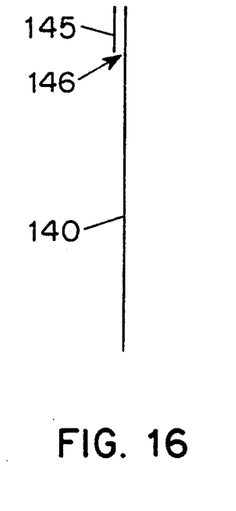
FIG. 16 shows in side view a shelf talker with front adhesive according to the invention.

FIG. 16 shows in side view a shelf talker 140 with front adhesive according to the invention. A removable strip 145 exposes the adhesive.

Figure 17:
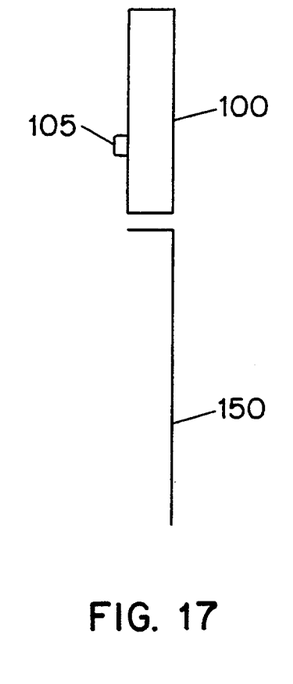
FIG. 17 shows in side view a label and a shelf talker with rear adhesive according to the invention.

FIG. 17 shows in side view a label 100 and a shelf talker 150 with rear adhesive such as that of FIG. 15 according to the invention. Button 105 may be seen at the front of the label 100.

FIG. 18 shows in a side cutaway view a label 100 which has an internal mounting slot mechanism 160 for a talker 150. A cylindrical rod 170 or a plurality of spheres 170 are captive within the slot in a mechanism that is well known in the art of clips for telephone messages and the like. When the talker is inserted into the slot it displaces the rod or spheres upward. When the talker is held motionless the rod or spheres drop downward, getting caught in a tapered region of the slot and gripping the talker. Desirably a sensor, omitted for clarity in FIG. 18, senses whether the talker is present or absent. The sensor may be a purely mechanical sensor or, for example, an LED-phototransistor sensor with a light path blocked by the talker.

While the invention has been described with respect to particular embodiments, those skilled in the art will have no difficulty devising variations which in no way depart from the invention, which is defined by the claims below. For example, while much of the embodiment has been described with respect to a store central computer executing a stored program, it will be appreciated that dedicated hardware could be employed to like effect and utility without departing from the invention. The communications link or links employed between store central computer and the display labels may just as well be wired or wireless, and if wireless may be infrared or radio for example; the label displays may be liquid-crystal or electroluminescent or other technologies; the talker sensors may be any of a variety of types of sensor; the power supply for the labels may be wired or battery or photocell; the labels may be internally controlled by microprocessors, application-specific integrated circuits, or state machines; and all these and numerous other aspects may be varied without departing from the invention.

We claim:

1. An electronic price display label for use in a retail store, the label comprising:
   a housing;
   a display within the housing;
   a power source;
   a communications channel to a computer external to the housing;
   a control means powered by the power source and operatively coupled with the display means and with the communications channel for displaying information to the display from the computer external to the housing; and
   a sensor disposed at the housing for sensing the presence and absence of a shelf talker at the housing and generating a signal indicative thereof;
   the control means further characterized in that the control means communicates the signal via the communications channel external to the housing.

2. The label of claim 1 wherein the communications channel is a wired serial data bus.

3. The label of claim 1 wherein the communications channel is a radio frequency link.

4. The label of claim 1 wherein the communications channel is an infrared link.

5. The label of claim 1 wherein the sensor is a light sensor positioned to receive differing amounts of ambient light depending on whether a shelf talker is absent or present.

6. The label of claim 5 wherein the light sensor is a phototransistor.

7. The label of claim 1 wherein the sensor is a capacitance sensor positioned to detect differing capacitances depending on whether a shelf talker is absent or present.

8. The label of claim 1 wherein the sensor is a mechanical sensor movable between two positions, the movement between the two positions depending on whether a shelf talker is absent or present.

9. The label of claim 1 wherein the power source is a battery located within the housing.

10. The label of claim 1 wherein the power source is a solar cell.

11. The label of claim 10 wherein the display is a liquid-crystal display and the solar cell is located behind the display.

12. The label of claim 2 wherein the power source is a line of the data bus.

13. The label of claim 1 wherein the label stores the event of a change of state of the signal, and responds to a subsequent poll from external to the housing via the communications channel with a response indicative of the change of state of the signal.

14. A label and shelf talker system for use in a retail store comprising a label and a shelf talker:

the label comprising a housing, a display within the housing, a power source, a communications channel to a computer external to the housing, a control means powered by the power source and operatively coupled with the display means and with the communications channel for displaying information to the display from the computer external to the housing, and a sensor disposed at the housing for sensing the presence and absence of a shelf talker at the housing and generating a signal indicative thereof, the control means further characterized in that the control means communicates the signal via the communications channel external to the housing; wherein the sensor is a light sensor positioned to receive differing amounts of ambient light depending on whether a shelf talker is absent or present;

the shelf talker comprising a planar main body bearing indicia, and an adhesive region in a strip across the top of the main body; a predetermined portion of the adhesive region fabricated from a material opaque to ambient light; the predetermined portion selected to be juxtaposed with the light sensor when the shelf talker is affixed to the label;

the shelf talker affixed to the label so that the predetermined portion is juxtaposed with the light sensor.

15. A label and shelf talker system for use in a retail store comprising a label and a shelf talker:

the label comprising a housing, a display within the housing, a power source, a communications channel to a computer external to the housing, a control means powered by the power source and operatively coupled with the display means and with the communications channel for displaying information to the display from the computer external to the housing, and a sensor disposed at the housing for sensing the presence and absence of a shelf talker at the housing and generating a signal indicative thereof, the control means further characterized in that the control means communicates the signal via the communications channel external to the housing; wherein the sensor is a light sensor positioned to receive differing amounts of ambient light depending on whether a shelf talker is absent or present;

the shelf talker comprising a planar main body bearing indicia, and an adhesive region in a strip across the top of the main body; a predetermined portion of the adhesive region bearing pigment selected to be opaque to ambient light; the predetermined portion selected to be juxtaposed with the light sensor when the shelf talker is affixed to the label;

the shelf talker affixed to the label so that the predetermined portion is juxtaposed with the light sensor.

16. A label and shelf talker system for use in a retail store comprising a label and a shelf talker:

the label comprising a housing, a display within the housing, a power source, a communications channel to a computer external to the housing, a control means powered by the power source and operatively coupled with the display means and with the communications channel for displaying information to the display from the computer external to the housing, and a sensor disposed at the housing for sensing the presence and absence of a shelf talker at the housing and generating a signal indicative thereof, the control means further characterized in that the control means communicates the signal via the communications channel external to the housing; wherein the sensor is a capacitance sensor positioned to detect differing capacitances depending on whether a shelf talker is absent or present;

the shelf talker comprising a planar main body bearing indicia, and an adhesive region in a strip across the top of the main body; a predetermined portion of the adhesive region bearing a metallized region;

the shelf talker affixed to the label so that the predetermined portion is juxtaposed with the capacitance sensor.

17. A label and shelf talker system for use in a retail store comprising a label and a shelf talker:

the label comprising a housing, a display within the housing, a power source, a communications channel to a computer external to the housing, a control means powered by the power source and operatively coupled with the display means and with the communications channel for displaying information to the display from the computer external to the housing, and a sensor disposed at the housing for sensing the presence and absence of a shelf talker at the housing and generating a signal indicative thereof, the control means further characterized in that the control means communicates the signal via the communications channel external to the housing; wherein the sensor is a mechanical sensor movable between two positions, the movement between the two positions depending on whether a shelf talker is absent or present;

the shelf talker comprising a planar main body bearing indicia, and an adhesive region in a strip across the top of the main body; the line between the adhesive region and the main body die-cut for easy folding;

the shelf talker folded at the die-cut line and the adhesive portion positioned to engage the sensor.

18. A label and shelf talker system for use in a retail store comprising a label and a shelf talker:

the label comprising a housing, a display within the housing, a power source, a communications channel to a computer external to the housing, a control means powered by the power source and operatively coupled with the display means and with the communications channel for displaying information to the display from the computer external to the housing, and a sensor disposed at the housing for sensing the presence and absence of a shelf talker at the housing and generating a signal indicative thereof, the control means further characterized in that the control means communicates the signal via the communications channel external to the housing; wherein the sensor is a mechanical sensor movable between two positions, the movement between the two positions depending on whether a shelf talker is absent or present;

the shelf talker comprising a planar main body bearing indicia, and an adhesive region in a strip across the top of the main body; the line between the adhesive region and the main body scored for easy folding;

the shelf talker folded at the scored line and the adhesive portion positioned to engage the sensor.

19. A store price display system comprising a store central computer and a multiplicity of electronic price display labels, each display label comprising:
 a housing;
 a display within the housing;
 a power source;
 a communications channel to the store central computer;
 a control means powered by the power source and operatively coupled with the display means and with the communications channel for displaying information to the display from the computer; and
 a sensor disposed at the housing for sensing the presence and absence of a shelf talker at the housing and generating a signal indicative thereof;
 the control means further characterized in that the control means communicates the signal via the communications channel to the computer.

20. The system of claim 19 wherein the computer further comprises a first storage means indicative of the sequence of physical locations of particular ones of the labels, and a second storage means indicative of desired placements and removals of shelf talkers with respect to particular ones of the labels;
 the computer programmed to generate a list, ordered by the sequence of physical locations of labels, of desired placements and removals of shelf talkers;
 the computer further programmed to receive information from the labels on the list regarding changes in the signals from the sensors thereof;
 the computer further programmed to note labels, if any, that are on the list and for which no signal was received indicative of the desired placement or removal of a shelf talker.

21. A method for use in an electronic price display system, the system comprising a store central computer and a multiplicity of electronic price display labels, each display label comprising a housing; a display within the housing; a power source; a communications channel to the store central computer; a control means powered by the power source and operatively coupled with the display means and with the communications channel for displaying information to the display from the computer; and a sensor disposed at the housing for sensing the presence and absence of a shelf talker at the housing and generating a signal indicative thereof; the control means further characterized in that the control means communicates the signal via the communications channel to the computer; wherein the computer further comprises a first storage means indicative of the sequence of physical locations of particular ones of the labels, and a second storage means indicative of desired placements and removals of shelf talkers with respect to particular ones of the labels; the method comprising the steps of:
 generating a list, ordered by the sequence of physical locations of labels, of desired placements and removals of shelf talkers;
 receiving information from the labels on the list regarding changes in the signals from the sensors thereof; and
 noting labels, if any, that are on the list and for which no signal was received indicative of the desired placement or removal of a shelf talker.

22. The method of claim 21 further comprising the step, performed after the generating step, of:
 annunciating, on the displays of labels on the list, indicia indicating that they are labels with respect to which a placement or removal of a shelf talker is desired.

23. The method of claim 22 further comprising the step, performed after the annunciating step, of restoring the display of a label after information is received indicating that the desired placement or removal of a shelf talker has occurred.

24. A method for use in an electronic price display system, the system comprising a store central computer and a multiplicity of electronic price display labels, each display label comprising a housing; a display within the housing; a power source; a communications channel to the store central computer; a control means powered by the power source and operatively coupled with the display means and with the communications channel for displaying information to the display from the computer; and a button disposed at the housing for generating a signal indicative of the button having been pressed; the control means further characterized in that the control means communicates the signal via the communications channel to the computer; wherein the computer further comprises a first storage means indicative of the sequence of physical locations of particular ones of the labels, and a second storage means indicative of desired placements and removals of shelf talkers with respect to particular ones of the labels; the method comprising the steps of:
 generating a list, ordered by the sequence of physical locations of labels, of desired placements and removals of shelf talkers;
 receiving information from the labels on the list regarding pressing of the buttons thereof; and
 noting labels, if any, that are on the list and for which no signal was received.

25. The method of claim 24 further comprising the step, performed after the generating step, of:
 annunciating, on the displays of labels on the list, indicia indicating that they are labels with respect to which a placement or removal of a shelf talker is desired.

26. The method of claim 25 further comprising the step, performed after the annunciating step, of restoring the display of a label after the button has been pressed.

* * * * *